(12) United States Patent
Prakash

(10) Patent No.: US 8,549,544 B1
(45) Date of Patent: Oct. 1, 2013

(54) SYSTEM, METHOD AND COMPUTER PROGRAM PRODUCT FOR PREVENTING THE EXECUTION OF UNWANTED CODE

(75) Inventor: Ranjan Prakash, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 1877 days.

(21) Appl. No.: 11/400,442

(22) Filed: Apr. 7, 2006

(51) Int. Cl.
*G06F 3/00* (2006.01)
*G06F 9/44* (2006.01)
*G06F 9/46* (2006.01)
*G06F 13/00* (2006.01)

(52) U.S. Cl.
USPC .......................................... 719/320

(58) Field of Classification Search
USPC .......................................... 719/320; 726/26
See application file for complete search history.

(56) References Cited

U.S. PATENT DOCUMENTS

| | | | | |
|---|---|---|---|---|
| 5,590,329 A | * | 12/1996 | Goodnow et al. | 717/144 |
| 5,615,400 A | * | 3/1997 | Cowsar et al. | 719/332 |
| 5,752,034 A | * | 5/1998 | Srivastava et al. | 717/130 |
| 5,794,041 A | * | 8/1998 | Law et al. | 717/104 |
| 6,658,421 B1 | * | 12/2003 | Seshadri | 717/140 |
| 6,754,887 B1 | * | 6/2004 | Gil et al. | 717/116 |
| 2002/0002680 A1 | * | 1/2002 | Carbajal et al. | 713/180 |
| 2002/0016864 A1 | * | 2/2002 | Brett | 709/315 |
| 2003/0140245 A1 | * | 7/2003 | Dahan et al. | 713/200 |
| 2006/0021054 A1 | * | 1/2006 | Costa et al. | 726/25 |

OTHER PUBLICATIONS

Rix, Smashing C++ VPTRS, May 1, 2000, Phrack Magazine, pp. 1-23.*
Mark M. Pollitt, Cyberterrorism—Fact or Fancy?, Apr. 29, 1999, FBI Laboratory, pp. 1-5.*
http://www.cse.unsw.edu.au/~cs3421/JavaLects/part2/index.html.

* cited by examiner

*Primary Examiner* — LeChi Truong
*Assistant Examiner* — Timothy A Mudrick
(74) *Attorney, Agent, or Firm* — Wong, Cabello, Lutsch, Rutherford & Brucculeri, LLP

(57) ABSTRACT

A system, method and computer program product are provided for preventing the execution of unwanted code. In use, it is determined whether an object is associated with a class having diamond inheritance. If it is determined that the object is associated with a class having diamond inheritance, an exploit of the object is prevented.

20 Claims, 5 Drawing Sheets

SYSTEM, METHOD AND COMPUTER PROGRAM PRODUCT FOR PREVENTING THE EXECUTION OF UNWANTED CODE

FIELD OF THE INVENTION

The present invention relates to compilers, and more particularly to preventing the execution of unwanted code.

BACKGROUND

Polymorphism is an integral concept of object oriented programming languages. It allows the same definitions to be used with different types of data, and particularly different classes of objects, which results in more general and abstract implementations. There are two kinds of polymorphism supported with existing object oriented programming languages including static and dynamic polymorphism. Static polymorphism is performed during compile-time and dynamic polymorphism is performed during run-time.

Inheritance allows an object of a derived class (e.g. an object from a child class, where the child class is derived from a parent class) to inherit characteristics of its base class (e.g. the parent or super class). Multiple-inheritance allows a class to be derived from more than one base class, allowing the objects of the class to inherit characteristics from all of its associated base classes. However, multiple-inheritance is conducive to problems.

For example, a problem may arise in a situation where class B is derived from class A, class C is derived from class A, and class D is derived from both class B and class C. Specifically, this type of multiple-inheritance allows the objects of class D to inherit characteristics from class B, class C and class A, such that class D inherits class A twice (i.e. through class B and class C). This multiple-inheritance causes ambiguity in the behavior of objects within class D containing characteristics of class A.

Instances where objects of one class inherit the characteristics of another class in a plurality of instances are known as "diamond inheritance." object oriented programming languages provide language constructs to resolve this kind of ambiguity, such as virtual base classes in C++. For example, in C++, class A can be made into a virtual base class to avoid multiple instances of class A in class D. When objects of classes with "diamond inheritance" are laid out in memory, virtual base classes, such as those in C++, float at the end of the layout and any reference to their location, whether direct or indirect, is kept at the beginning of the layout.

One problem with "diamond inheritance" and the way in which object oriented programming languages respond to the same is that vulnerabilities exist in the way in which compilers implement support for it. In particular, for each virtual base class, compilers store the offsets that the virtual base class has from the start of each of the child classes that derive from such virtual base class. When a polymorphic behavior is invoked, the compiler uses these offsets to traverse through various virtual base classes to determine the class specific implementation of the desired behavior. This approach creates a problem in that the offset can be changed to point to any other with unwanted behaviors. This enables a hacker, etc. to gain complete control over an associated application.

There is thus a need for overcoming these and/or other problems associated with the prior art.

SUMMARY

A system, method and computer program product are provided for preventing the execution of unwanted code. In use, it is determined whether an object is associated with a class having diamond inheritance. If it is determined that the object is associated with a class having diamond inheritance, an exploit of the object is prevented.

DETAILED DESCRIPTION

Figure 1:
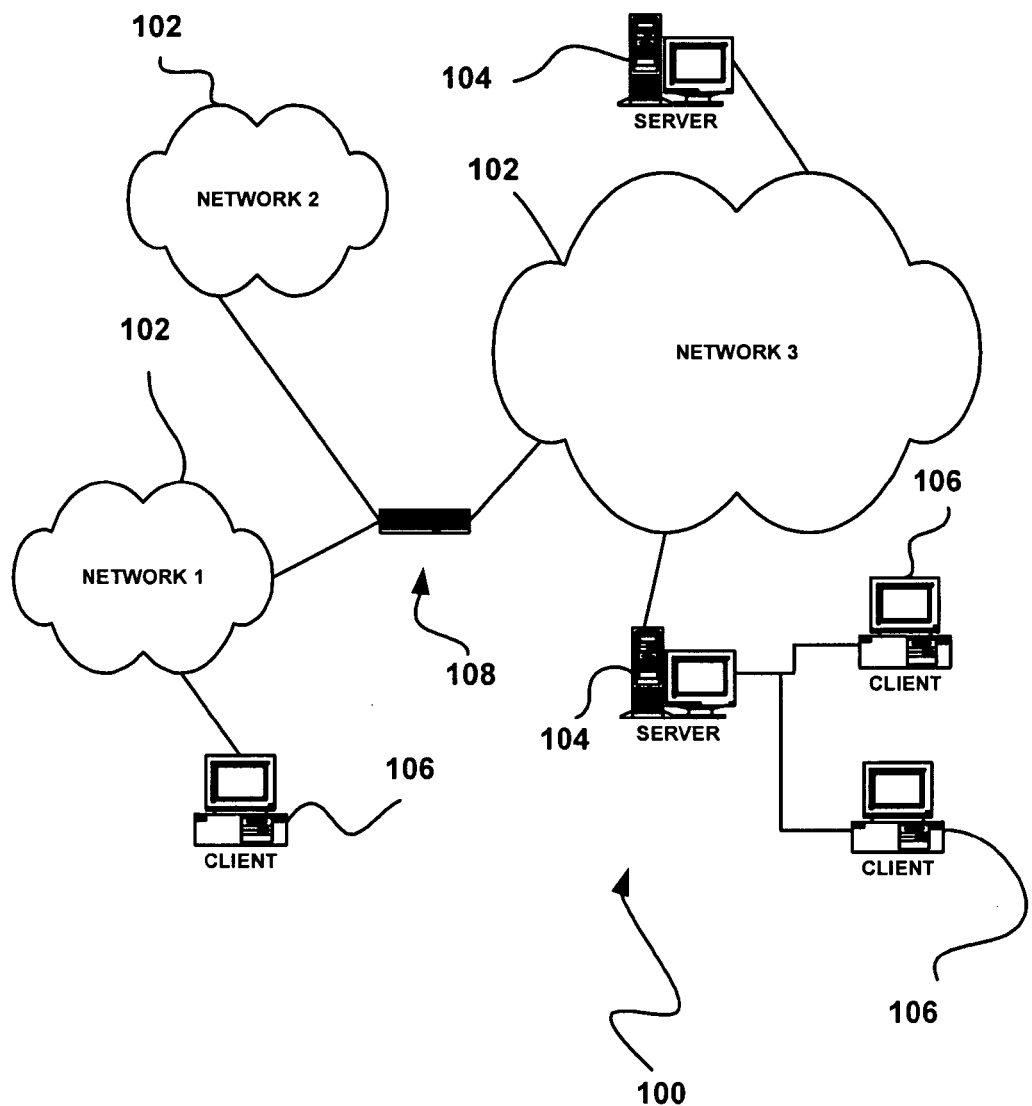
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are server computers 104 which are capable of communicating over the networks 102. Also coupled to the networks 102 and the server computers 104 is a plurality of client computers 106. Such server computers 104 and/or client computers 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
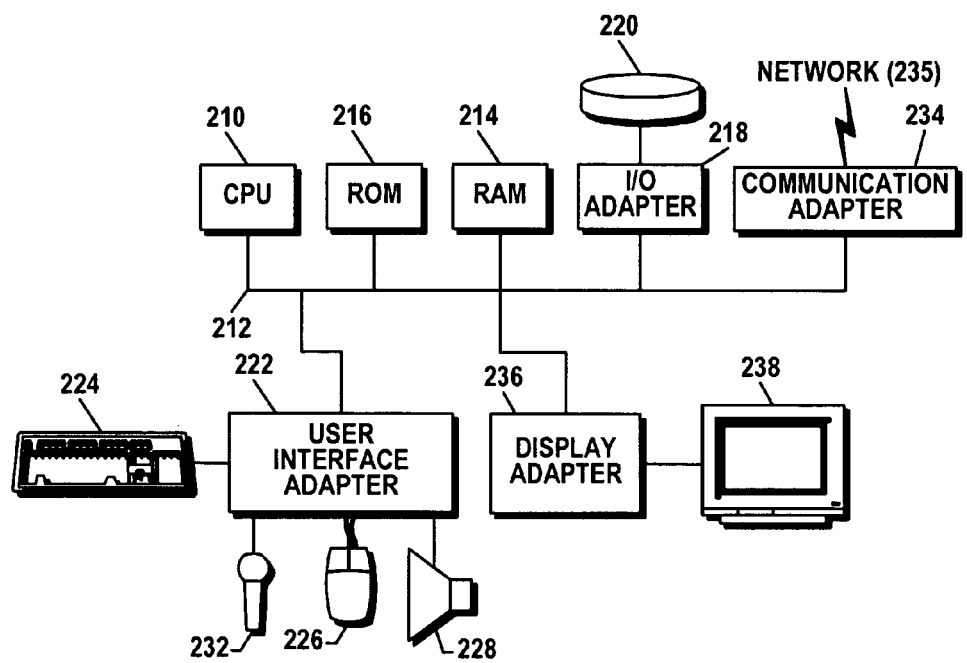
FIG. 2 shows a representative hardware environment that may be associated with the server computers and/or client computers of FIG. 1, in accordance with one embodiment.

FIG. 2 shows a representative hardware environment that may be associated with the server computers 104 and/or client computers 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Our course, the various embodiments set forth herein may be implemented utilizing hardware, software, or any desired combination thereof. For that matter, any type of logic may be utilized which is capable of implementing the various functionality set forth herein.

Figure 3:
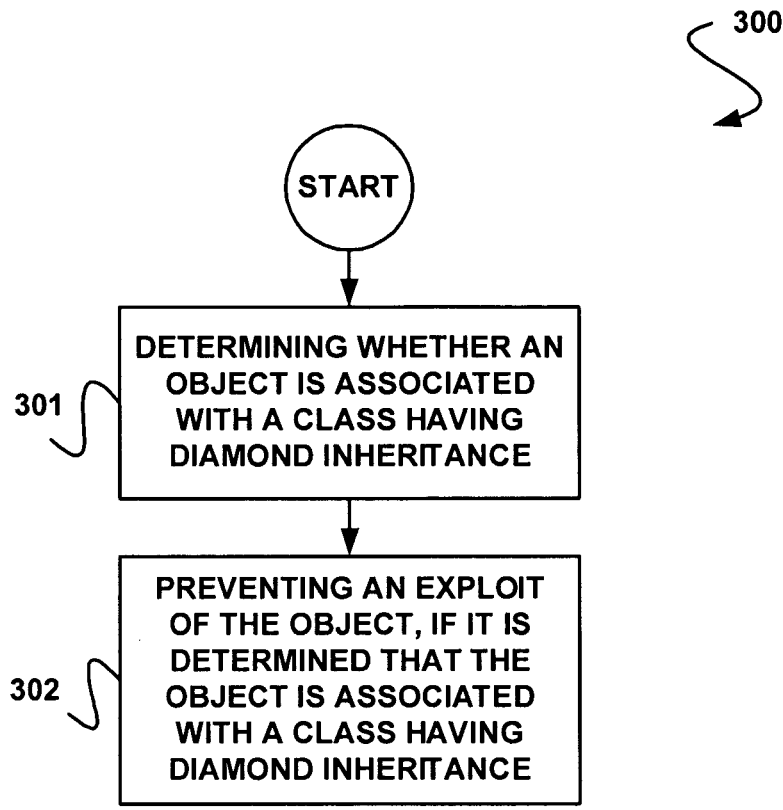
FIG. 3 shows a method for protecting a compiler, in accordance with one embodiment.

FIG. 3 shows a method 300 for protecting a compiler, in accordance with one embodiment. As an option, the method 300 may be implemented in the context of the architecture and environment of FIGS. 1 and/or 2. Of course, however, the method 300 may be carried out in any desired environment.

As shown in operation 301, it is determined whether an object is associated with a class having diamond inheritance. The object may include any entity capable of being created utilizing a programming language. In one optional embodiment, the object may also be associated with a virtual base class. Furthermore, in other embodiments, the object may have operations associated with it. Specifically, the object may be an instance of the class, and the class may define the operations associated with the object. Further, the class may include any program code or convention which defines the characteristics or behaviors of the object. In one optional embodiment, the class may be a virtual base class.

The class may have diamond inheritance if it is has multiple inheritances, is derived from multiple instances of a parent class, etc. In one optional embodiment, if it is a child class that inherits properties from a parent class through both of two intermediary classes, then the class may have diamond inheritance. For example, if there exists a parent class A, and intermediate classes B and C both inherit from class A, class D may be considered to have diamond inheritance if it inherits from both B and class C. Specifically, class D has diamond inheritance because it inherits class A through both class B and C.

It may be determined whether the object is associated with a class having diamond inheritance utilizing any desired method. For example, in one optional embodiment, an inheritance tree may be created with the class associated with the object being the ultimate parent node. In this way, if it determined that any leaf node class is inherited by the parent node more than once, the parent node may be identified as having diamond inheritance. Of course any other process of determining whether the object is associated with a class having diamond inheritance may be utilized.

If it is determined that the object is associated with a class having diamond inheritance, an exploit of the object is prevented, as shown in operation 302. Of course, more than one exploit of the object may also be prevented. Further, the exploit may be a known exploit associated with a known vulnerability of the object or an unknown exploit associated with a known/unknown vulnerability of the object.

In the case of a known exploit, specific known behaviors associated with the exploit may be identified with respect to the object. In the case of the unknown exploit, behaviors associated with the object may be monitored for identifying behaviors that meet a specified threshold and/or any other criteria. In this way, attempted exploits of the object may be identified. Of course, any process may be used capable of identifying an attempted exploit of the object.

Once an attempted exploit of the object is identified, the exploit may be prevented. In another aspect, the exploit may be prevented without any actual exploit attempt being made. Thus, a pre-emptive protection mechanism may be established. Such exploit may be prevented by blocking behaviors associated with the exploit, by eliminating vulnerabilities associated with the object, and/or any other method capable of preventing an exploit with respect to the object. In one instance, a table of offsets between classes and the objects associated with the offsets may be utilized in preventing an exploit of the object, which will be described in more detail with respect to FIG. 4. In addition, another exemplary method of preventing the exploit will be described with respect to FIG. 5.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
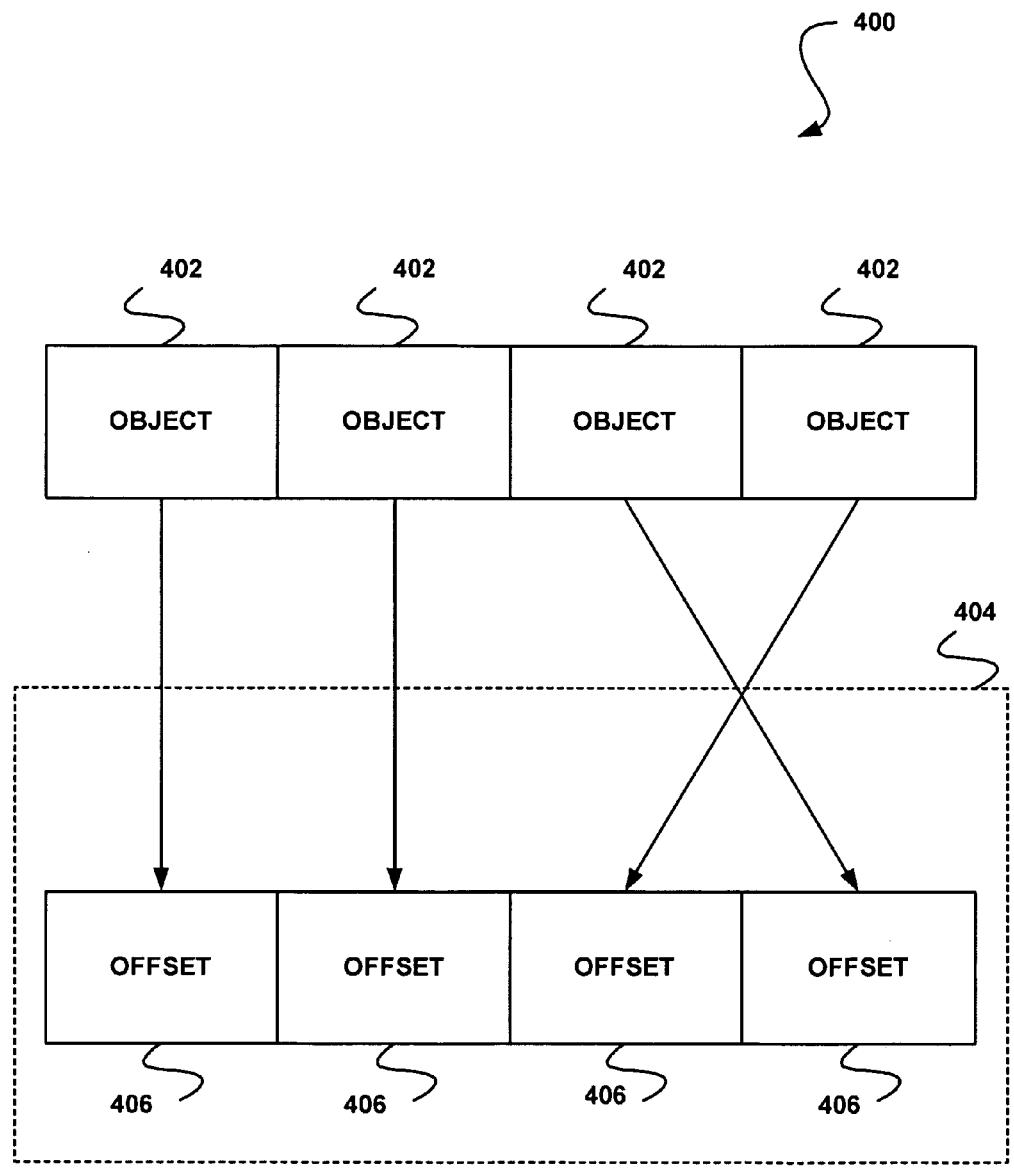
FIG. 4 shows a data structure indicating offsets between classes and the objects associated with the offsets, in accordance with another embodiment.

FIG. 4 shows a data structure 400 indicating offsets between classes and the objects associated with the offsets, in accordance with another embodiment. As an option, the data structure 400 may be implemented in the context of the architecture and environment of FIGS. 1-3. Of course, however, the data structure 400 may be carried out in any desired environment. It should also be noted that the aforementioned definitions may apply during the present description.

As shown, the data structure 400 may contain a plurality of objects 402. The data structure 400 may also contain a table 404 including a plurality of offsets 406. Each offset 406 may, in turn, correspond to a different class. Specifically, each offset 406 may represent the offset a particular child class has from its parent class. Thus, a child class with a greater degree of relationship to the parent class will have a greater offset with respect to a child class with a smaller degree of relationship to the parent class.

For instance, if a child class is directly derived from the parent class, the offset 406 for the child class may only be one. On the other hand, if a child class is derived from the parent class through an intermediary class (i.e. the child class is derived from an intermediary class which itself is derived from the parent class), the offset 406 for that child class may be two. Of course, the offsets 406 may be determined in any manner capable of representing the relationship between a class and a parent class.

Still yet, each object 402 may be linked to an offset 406. The object 402 may be any object associated with the class from which the offset 402 is based. The object 402 may include a pointer that points to the offset 406, or may be linked to the offset 406 utilizing the table 404. Of course, the object 402 may be linked to the offset 406 in any desired manner.

As an option, the table 404 may be created during compile-time. In addition, the table 404 may be stored in a designated area of memory in a computer system, such as any of the systems described with respect to FIG. 1. Furthermore, the designated area of memory may be read-only and may also maintain known address boundaries. Thus, the link may be utilized to verify that the object 402 is associated with a known class that will not be used to exploit the associated object 402. In this way, the object 402 may only be processed if such link is successfully verified.

Figure 5:
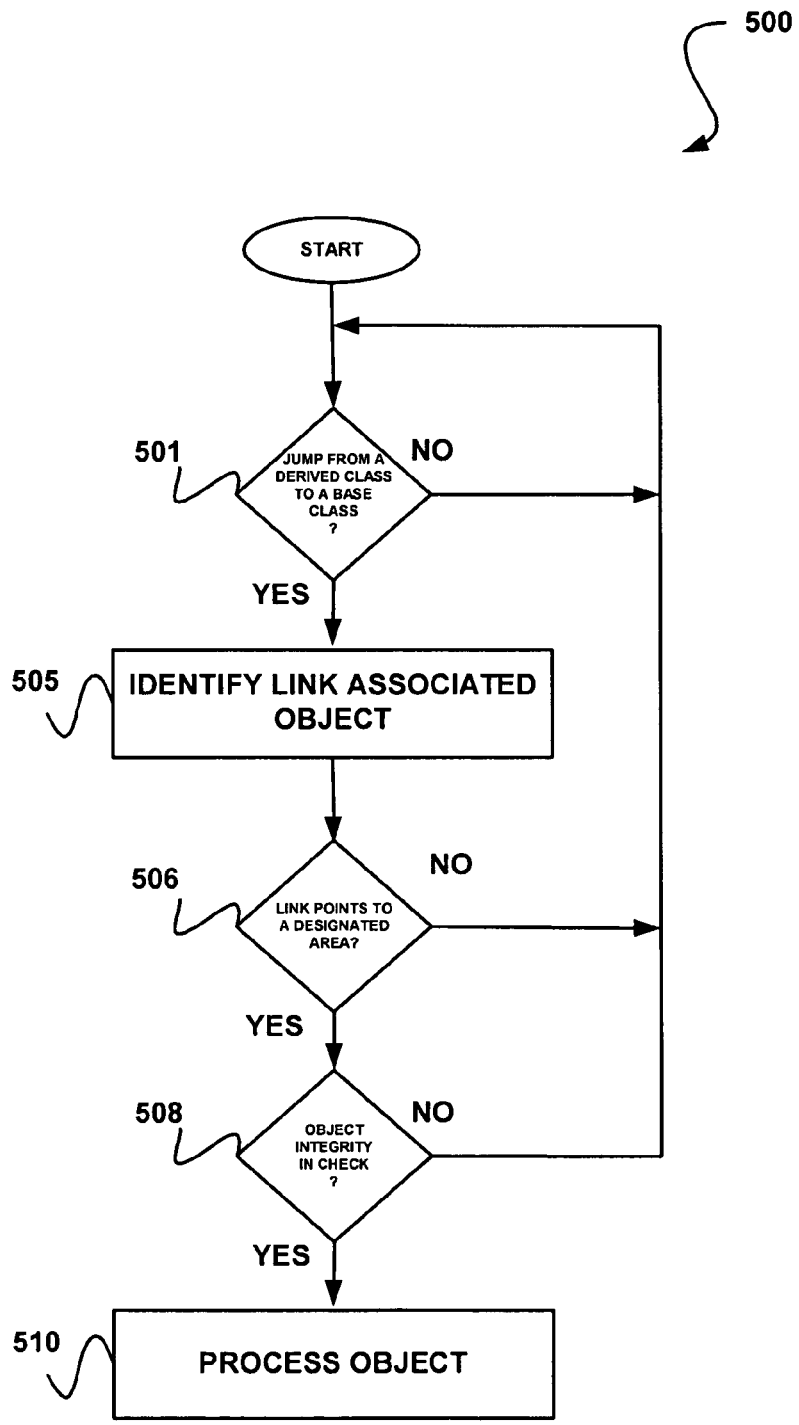
FIG. 5 shows a method for protecting a compiler, in accordance with yet another embodiment.

FIG. 5 shows a method 500 for protecting a compiler, in accordance with yet another embodiment. As an option, the method 500 may be implemented in the context of the architecture and environment of FIGS. 1-4. Of course, however, the method 500 may be carried out in any desired environment. It should also be noted that the aforementioned definitions may apply during the present description.

As shown in decision 501, it is determined whether a jump from a derived class to a base class has been called. Such determination may optionally be made during run-time. For instance, if an object is called within a function and the object derives characteristics not only from its own class, but also from a parent class, then a jump may be made within the function from the object's class to the parent class. This code jump may allow for all of the characteristics of the called object to be identified. Of course, such jump is set forth by way of example only, and may be made in any circumstance where an object is associated with a class that is derived from a parent class.

If a jump is not identified in decision 501, the method 500 may continue by waiting for such a jump. If, however, a jump is identified in decision 501, a link associated with the object may be identified in operation 505. The link may include, for instance, one of the links described with respect to FIG. 4.

Specifically, the link may include a link from the object to an offset of the associated class. The associated class may include the class from which the object is created. Again, as described in FIG. 4, the offset may include the offset between a particular child class (i.e. the class from which the object is created) and its parent class.

Based on the identified link of operation 505, it is determined whether such link points to a designated area of memory, as shown in decision 506. Specifically, it may be determined whether the link points to an offset of a class located in a designated area of memory. As set forth hereinabove, the designated area of memory may be read-only and/or may also optionally have known address boundaries.

In this way, the designated area of memory may be protected from any sort of unwanted data and/or code capable of exploiting the object [e.g. hacker-related data/code, malware (e.g. viruses, Trojans, worms, etc.), spyware, adware, etc.), and therefore characteristics applied to the object from such associated class may be verified as being trusted. If the link does not point to the designated area of memory, as determined in decision 506, the object may be prevented from being processed. Furthermore, the method 500 may return to decision 501 and continue to wait for a next jump from a derived class to a base class.

If it is determined in decision 506, however, that the link does point to a designated area of memory, it may then be determined whether the object associated with the link has integrity. See decision 508. Just by way of example, it may be determined whether the offset of the class pointed to by the object points to any other objects. In particular, it may be determined whether such class points to an untrusted object. For instance, an object may be untrusted if a characteristic of the object has been modified by unwanted data and/or code. Further, the object may include an object of the base class discussed in decision 501.

The object associated with the link may also have integrity if it is stored in memory with other objects in a contiguous manner. Specifically, it may be determined whether objects are stored in memory contiguously in accordance with the offsets of the classes with which they are associated. Thus, objects associated with a class with a greater offset may be stored after objects associated with a class with a lesser offset. In addition, it may be determined whether the object is contiguously stored with other objects associated with the class. Of course, the object's integrity may be determined in any desired manner, such as for example, any manner that verifies the trustworthiness of the object and associated characteristics.

In this way, for example, a size_of_class command may be utilized to receive the number of bytes the class requires to be fully allocated. So long as the objects are stored contiguously, the received number of bytes may then be utilized to locate the object. In one instance, the received number of bytes may be added to a pointer in order to locate, copy, and then paste the object as needed.

If it is determined in decision 508 that the object does not pass the integrity check, the object may be prevented from being processed. In addition, the method 500 may return to decision 501 and may continue waiting for a next jump from a derived class to a base class. If, however, it is determined in decision 508 that the object does pass the integrity check, the object may be processed, as shown in operation 510. For instance, a function call involving the object may be allowed to proceed. Thus, the method 500 may provide security, such that when an object is called by a function, the characteristics of the object may first be verified prior to allowing the object to be processed.

In one embodiment, terrorism may be countered utilizing the aforementioned technology. According to the U.S. Federal Bureau of Investigation, cyber-terrorism is any "premeditated, politically motivated attack against information, computer systems, computer programs, and data which results in violence against non-combatant targets by subnational groups or clandestine agents." A cyber-terrorist attack is designed to cause physical violence or extreme financial harm. According to the U.S. Commission of Critical Infrastructure Protection, possible cyber-terrorist targets include the banking industry, military installations, power plants, air traffic control centers, and water systems. Thus, by optionally incorporating the present technology into the cyber-frameworks of the foregoing potential targets, terrorism may be countered by preventing object exploits, which may be used to combat cyber-terrorism.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A computer-implemented method using object-oriented programming, comprising:
    creating a table of offsets between a parent class and each class that is derived from the parent class;
    determining whether an object that is a member of a class hierarchy is associated with a class having diamond inheritance; and
    preventing an exploit of the object when it is determined that the object is associated with the class having diamond inheritance, the exploit possible as a result of a vulnerability in a manner in which a compiler implements support for the object associated with the class having diamond inheritance,
    wherein the act of preventing the exploit of the object includes performing an integrity check on the object.

2. The method of claim 1, wherein the class having diamond inheritance is derived from multiple instances of a parent class.

3. The method of claim 1, wherein the object is associated with a virtual base class.

4. The method of claim 1, further comprising the act of storing the table in a designated area of memory.

5. The method of claim 4, wherein the act of storing the table in the designated area of memory includes the act of storing the table in electrically erasable read-only memory.

6. The method of claim 5, wherein the designated area of the read-only memory is maintained in known address boundaries.

7. The method of claim 1, wherein the act of creating a table of offsets between classes includes the act of creating the table of offsets at compile-time.

8. The method of claim 1, wherein the act of preventing the exploit of the object further includes:
   identifying a link associated with the object; and
   determining whether the link points to a designated area of memory.

9. The method of claim 8, wherein the act of identifying the link includes the act of identifying a pointer from the object to an associated offset.

10. The method of claim 8, wherein the act of identifying the link occurs in response to an identification of a code jump from the class having diamond inheritance to a parent class.

11. The method of claim 1, wherein the act of performing an integrity check on the object includes the act of determining whether the object is contiguously stored with other objects associated with the class.

12. The method of claim 1, further comprising the act of processing the object when the integrity check indicates that the object is trustworthy.

13. The method of claim 1, wherein the act of preventing the exploit of the object is carried out at run-time.

14. A computer program product embodied on a non-transitory computer readable medium, comprising instructions to cause a processor to:
   create a table of offsets between a parent class and each class that is derived from the parent class;
   determine whether an object that is a member of a class hierarchy is associated with a class in the class hierarchy having diamond inheritance; and
   prevent an exploit of the object when it is determined that the object is associated with the class having diamond inheritance, the exploit possible as a result of a vulnerability in a manner in which a compiler implements support for the object associated with the class having diamond inheritance,
   wherein the instructions to cause the processor to prevent the exploit of the object comprise instructions to cause the processor to perform an integrity check on the object.

15. The method of claim 1, wherein the act of preventing the exploit of the object further includes at least one of blocking behaviors associated with known exploits and eliminating the vulnerability.

16. The method of claim 1, wherein the act of performing the integrity check on the object includes the act of determining whether an offset of the class pointed to by the object points to an untrusted object with a characteristic that has been modified.

17. The computer program product embodied on a non-transitory computer readable medium of claim 14, wherein the class having diamond inheritance is derived from multiple instances of a parent class.

18. The computer program product embodied on a non-transitory computer readable medium of claim 14, wherein the object is associated with a virtual base class.

19. The computer program product embodied on a non-transitory computer readable medium of claim 14, wherein the instructions to prevent the exploit of the object further includes instructions to:
   identify a link associated with the object; and
   determine whether the link points to a designated area of memory.

20. A system, comprising:
   a memory; and
   a processor operatively coupled to the memory, the processor adapted to execute program code stored in the memory to:
      create a table of offsets between a parent class and each class that is derived from the parent class,
      determine whether an object that is a member of a class hierarchy is associated with a class having diamond inheritance, and
      prevent an exploit of the object when it is determined that the object is associated with the class having diamond inheritance, the exploit possible as a result of a vulnerability in a manner in which a compiler implements support for the object associated with the class having diamond inheritance,
   wherein the act of preventing the exploit of the object includes the act of performing an integrity check on the object.

* * * * *